US012313466B2

(12) United States Patent
Tabata et al.

(10) Patent No.: US 12,313,466 B2
(45) Date of Patent: *May 27, 2025

(54) SPECTROSCOPIC UNIT AND SPECTROSCOPIC MODULE

(71) Applicant: HAMAMATSU PHOTONICS K.K., Hamamatsu (JP)

(72) Inventors: Kei Tabata, Hamamatsu (JP); Masaaki Muto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,187

(22) Filed: Mar. 27, 2024

(65) Prior Publication Data
US 2024/0230405 A1 Jul. 11, 2024

Related U.S. Application Data

(63) Continuation of application No. 17/287,157, filed as application No. PCT/JP2019/030984 on Aug. 6, 2019, now Pat. No. 11,971,301.

(30) Foreign Application Priority Data

Oct. 31, 2018 (JP) ................. 2018-204894

(51) Int. Cl.
*G01J 3/28* (2006.01)
*G01J 3/02* (2006.01)
(Continued)

(52) U.S. Cl.
CPC ............ *G01J 3/28* (2013.01); *G01J 3/0291* (2013.01); *G01J 3/26* (2013.01); *G02B 5/284* (2013.01); *G01J 2003/1252* (2013.01)

(58) Field of Classification Search
CPC ..... G01J 3/26; G01J 3/0291; G01J 3/10; G01J 3/2823; G01J 3/51; G01J 3/0205;
(Continued)

(56) References Cited

U.S. PATENT DOCUMENTS 11,971,301 B2 * 4/2024 Tabata ................. G02B 5/284
2002/0101574 A1 8/2002 Tsuji
(Continued)

FOREIGN PATENT DOCUMENTS

CN 103245998 A 8/2013
CN 103913856 A 7/2014
(Continued)

OTHER PUBLICATIONS

International Preliminary Report on Patentability mailed May 14, 2021 for PCT/JP2019/030984.

*Primary Examiner* — Don K Wong
(74) *Attorney, Agent, or Firm* — Faegre Drinker Biddle & Reath LLP

(57) ABSTRACT

A spectroscopic unit includes a housing, a light incident portion provided in the housing, a Fabry-Perot interference filter arranged in the housing and having a first mirror and a second mirror, a distance between the first mirror and the second mirror being variable. The light incident portion includes an aperture portion in which an aperture is formed and a band pass filter arranged between the aperture and the Fabry-Perot interference filter. The aperture portion is configured so that a value obtained by dividing a length of the aperture in a facing direction of the first mirror and the second mirror by a width of the aperture in a direction perpendicular to the facing direction is equal to or more than 0.5 and the entirety of light passing through the aperture is incident on the band pass filter.

22 Claims, 9 Drawing Sheets

(51) Int. Cl.
*G01J 3/26* (2006.01)
*G02B 5/28* (2006.01)
*G01J 3/12* (2006.01)

(58) Field of Classification Search
CPC .. G01J 3/447; G01J 3/02; G01J 3/0229; G01J 3/0208; G01J 1/04; G02B 26/001; G02B 26/00; G02B 5/28; G02B 26/023; G02B 26/08; G01N 21/0303; G01N 21/31; G02F 1/21; G02F 1/213; G02F 1/33526; G02F 2203/18; G02F 1/0128
See application file for complete search history.

(56) References Cited

U.S. PATENT DOCUMENTS

| | | |
|---|---|---|
| 2008/0062426 A1 | 3/2008 | Yoshida |
| 2010/0141152 A1 | 6/2010 | Meijer et al. |
| 2010/0148083 A1 | 6/2010 | Brown et al. |
| 2011/0215432 A1 | 9/2011 | Uematsu et al. |
| 2012/0133948 A1 | 5/2012 | Funamoto |
| 2014/0192077 A1 | 7/2014 | Gomi et al. |
| 2015/0279827 A1 | 10/2015 | Tu et al. |
| 2016/0282183 A1 | 9/2016 | Kanai et al. |
| 2018/0136042 A1 | 5/2018 | Goldring et al. |
| 2018/0188110 A1 | 7/2018 | Goldring et al. |
| 2018/0292267 A1 | 10/2018 | Hirose et al. |

FOREIGN PATENT DOCUMENTS

| | | |
|---|---|---|
| CN | 104049293 A | 9/2014 |
| CN | 105339829 A | 2/2016 |
| CN | 105683725 A | 6/2016 |
| CN | 105987752 A | 10/2016 |
| CN | 107532941 A | 1/2018 |
| CN | 108139270 | 6/2018 |
| CN | 108344506 A | 7/2018 |
| EP | 3355037 A1 | 8/2018 |
| JP | H8-274397 A | 10/1996 |
| JP | H09-318446 A | 12/1997 |
| JP | 2001-221913 A | 8/2001 |
| JP | 2004-014924 A | 1/2004 |
| JP | 2007-264847 A | 10/2007 |
| JP | 2008-128912 A | 6/2008 |
| JP | 2008-183350 A | 8/2008 |
| JP | 2010-151639 A | 7/2010 |
| JP | 2013-033067 A | 2/2013 |
| JP | 2013-210277 A | 10/2013 |
| JP | 2014-132304 A | 7/2014 |
| JP | 2014-145643 A | 8/2014 |
| JP | 2015-049276 A | 3/2015 |
| JP | 2015-200559 A | 11/2015 |
| JP | 2016-031295 A | 3/2016 |
| JP | 2016-166865 A | 9/2016 |
| JP | 2016-176910 A | 10/2016 |
| JP | 2018-010038 A | 1/2018 |
| JP | 2018-077257 A | 5/2018 |
| WO | WO 93/009422 A1 | 5/1993 |
| WO | 2008/099779 A1 | 8/2008 |
| WO | WO 2017/057372 A1 | 4/2017 |
| WO | WO 2018/174047 A1 | 9/2018 |
| WO | WO 2018/180241 A1 | 10/2018 |

\* cited by examiner (a)

(b)

(a)

(b)

SPECTROSCOPIC UNIT AND SPECTROSCOPIC MODULE

TECHNICAL FIELD

The present disclosure relates to a spectroscopic unit and a spectroscopic module.

BACKGROUND ART

A spectroscopic module that includes a light source that emits light with which an object is irradiated, a spectroscopic unit that disperses light reflected by the object or light that has passed through the object, and a light detector that detects the light dispersed by the spectroscopic unit is known (see, for example, Patent Literature 1). According to such a spectroscopic module, for example, it is possible to analyze the components of an object in a non-destructive manner.

CITATION LIST

Patent Literature

Patent Literature 1: Japanese Unexamined Patent Publication No. 2014-145643

SUMMARY OF INVENTION

Technical Problem

In the spectroscopic module as described above, a Fabry-Perot interference filter may be applied to the spectroscopic unit. In this case, improvement of the spectroscopic accuracy of the Fabry-Perot interference filter is very important for improving the analytical accuracy of the components of the object, for example.

An object of the present disclosure is to provide a spectroscopic unit and a spectroscopic module capable of improving the spectroscopic accuracy of the Fabry-Perot interference filter.

Solution to Problem

According to one aspect of the present disclosure, a spectroscopic unit includes a housing, a light incident portion provided to the housing, and a Fabry-Perot interference filter arranged in the housing and having a first mirror and a second mirror, a distance between the first mirror and the second mirror being variable. The light incident portion has an aperture portion in which an aperture is formed, and a band pass filter arranged between the aperture and the Fabry-Perot interference filter. The aperture portion is configured so that a value obtained by dividing a length of the aperture in a facing direction of the first mirror and the second mirror by a width of the aperture in a direction perpendicular to the facing direction is equal to or more than 0.5 and the entirety of light passing through the aperture is incident on the band pass filter.

In the spectroscopic unit, the aperture portion is configured so that the value obtained by dividing the length of the aperture by the width of the aperture is equal to or more than 0.5, and the entirety of the light passing through the aperture is incident on the band pass filter. Therefore, the entirety of the light passing through the aperture is incident on the band pass filter in a state where the range of the incident angle is narrowed. Thus, the band pass filter functions properly, and light in a desired wavelength range is incident on the Fabry-Perot interference filter in a state where the range of the incident angle is narrowed. Thus, the resolution in a spectral spectrum obtained by the Fabry-Perot interference filter is improved. Therefore, according to the spectroscopic unit, it is possible to improve the spectroscopic accuracy of the Fabry-Perot interference filter.

In the spectroscopic unit according to one aspect of the present disclosure, the aperture portion may be configured so that the entirety of the light passing through the aperture and being transmitted through the band pass filter is incident on the Fabry-Perot interference filter. According to this configuration, it is possible to suppress the generation of stray light in the housing.

In the spectroscopic unit according to one aspect of the present disclosure, when viewed from the facing direction, an outer edge of the aperture may be located inside an outer edge of a light transmission region of the Fabry-Perot interference filter. According to this configuration, it is possible to increase the proportion of light transmitted through a light transmission region of the Fabry-Perot interference filter to the light passing through the aperture.

The spectroscopic unit according to one aspect of the present disclosure may further include a light detector arranged in the housing and detecting light transmitted through the Fabry-Perot interference filter. According to this configuration, it is possible to detect the dispersed light with high accuracy while suppressing the generation of noise caused by stray light. Further, because the light detector is arranged in the housing, it is possible to reduce the size of the spectroscopic unit including the light detector.

In the spectroscopic unit according to one aspect of the present disclosure, the light incident opening and the light emission opening of the aperture may have a circular shape. According to this configuration, it is possible to easily form the aperture having desired performance.

In the spectroscopic unit according to one aspect of the present disclosure, a diameter of the aperture may be constant between the light incident opening and the light emission opening. Alternatively, the diameter of the aperture may change from the light incident opening to the light emission opening at a constant change ratio. Alternatively, the diameter of the aperture may change from the light incident opening to the light emission opening at a change ratio of 0 or more. The change ratio may be continuous between the light incident opening and the light emission opening and change at at least a portion between the light incident opening and the light emission opening. Even in the cases, it is possible to easily form the aperture having desired performance.

In the spectroscopic unit according to one aspect of the present disclosure, a region inside the aperture may be a space. According to this configuration, it is possible to prevent the loss of light due to passing through the aperture.

The spectroscopic unit according to one aspect of the present disclosure may further include an aperture member formed separately from the housing and provided with an aperture portion. According to this configuration, it is possible to improve the degree of freedom in designing the aperture portion, such as selection of a suitable material. In addition, by forming a large light incident opening in the housing, it is possible to adjust the positional relationship between the aperture and the Fabry-Perot interference filter while relaxing the positional accuracy of the Fabry-Perot interference filter in the housing.

In the spectroscopic unit according to one aspect of the present disclosure, the aperture member may be provided with a positioning portion configured to position the housing. According to this configuration, it is possible to prevent deviation of the positional relationship between the aperture and the Fabry-Perot interference filter due to vibration or the like. Further, because the aperture portion and the positioning portion are provided in the aperture member, it is possible to ensure the positional accuracy between the aperture portion and the positioning portion.

In the spectroscopic unit according to one aspect of the present disclosure, a hole in which a light source is arranged may be formed in the aperture member. According to this configuration, because the hole and the aperture are formed in the aperture member, it is possible to ensure the positional accuracy between the light source and the aperture.

In the spectroscopic unit according to one aspect of the present disclosure, the aperture member may form at least a portion of a package that accommodates the housing. According to this configuration, it is possible to more reliably suppress the generation of stray light in the housing.

In the spectroscopic unit according to one aspect of the present disclosure, the band pass filter may be spaced from the aperture portion with a portion of the housing interposed therebetween. According to this configuration, because the band pass filter is arranged in the housing, it is possible to protect the band pass filter from physical interference and the like.

In the spectroscopic unit according to one aspect of the present disclosure, the band pass filter may be in contact with the aperture portion. According to this configuration, it is possible to more reliably cause the entirety of light passing through the aperture to be incident on the band pass filter.

In the spectroscopic unit according to one aspect of the present disclosure, the aperture portion may be formed integrally with the housing. According to this configuration, it is possible to prevent an occurrence of a situation in which the positional relationship between the aperture and the Fabry-Perot interference filter is deviated by vibration or the like, with a simple configuration.

According to one aspect of the present disclosure, a spectroscopic module includes the above-described spectroscopic unit, a light source, and a package accommodating the housing of the spectroscopic unit and the light source. A light incident opening of the aperture and a light emitting portion of the light source are arranged along an outer surface of the package so as to be adjacent to each other.

According to the spectroscopic module, it is possible to realize a reflection type spectroscopic module in which the spectroscopic accuracy of the Fabry-Perot interference filter is improved.

In the spectroscopic module according to one aspect of the present disclosure, the light incident opening of the aperture and the light emitting portion of the light source may be located in a recess formed on the outer surface. According to this configuration, even in a state where the outer surface of the aperture member is brought into contact with an object, the region inside the recess is secured as an optical path. Thus, it is possible to irradiate the object with light and detect light reflected by the object.

In the spectroscopic module according to one aspect of the present disclosure, the aperture may be formed on the bottom surface of a first part of the recess. According to this configuration, even in a state where the outer surface of the aperture member is brought into contact with an object, it is possible to reliably cause light reflected by the object to be incident on the aperture.

In the spectroscopic module according to one aspect of the present disclosure, a hole in which the light source is arranged may be formed on the bottom surface of a second part of the recess, the second part being deeper than the first part. According to this configuration, even in a state where the outer surface of the aperture member is brought into contact with an object, it is possible to sufficiently irradiate the object with light emitted from the light source.

In the spectroscopic module according to one aspect of the present disclosure, a concave curved surface may be formed between the bottom surface of the second part and the side surface of the recess. According to this configuration, because the object is also irradiated with the light reflected by the concave curved surface, it is possible to more sufficiently irradiate the object with the light emitted from the light source.

In the spectroscopic module according to one aspect of the present disclosure, the hole may have a size including the aperture when viewed from the facing direction. According to this configuration, it is possible to irradiate the object with light emitted from the light source over a wide range.

Advantageous Effects of Invention

According to the present disclosure, it is possible to provide a spectroscopic unit and a spectroscopic module capable of improving the spectroscopic accuracy of the Fabry-Perot interference filter.

DESCRIPTION OF EMBODIMENTS

Hereinafter, embodiments of the present disclosure will be described in detail with reference to the drawings. Note that the same or corresponding parts in the respective drawings are denoted with the same reference signs, and repetitive descriptions will be omitted.

[Light Detecting Device]

Figure 1:
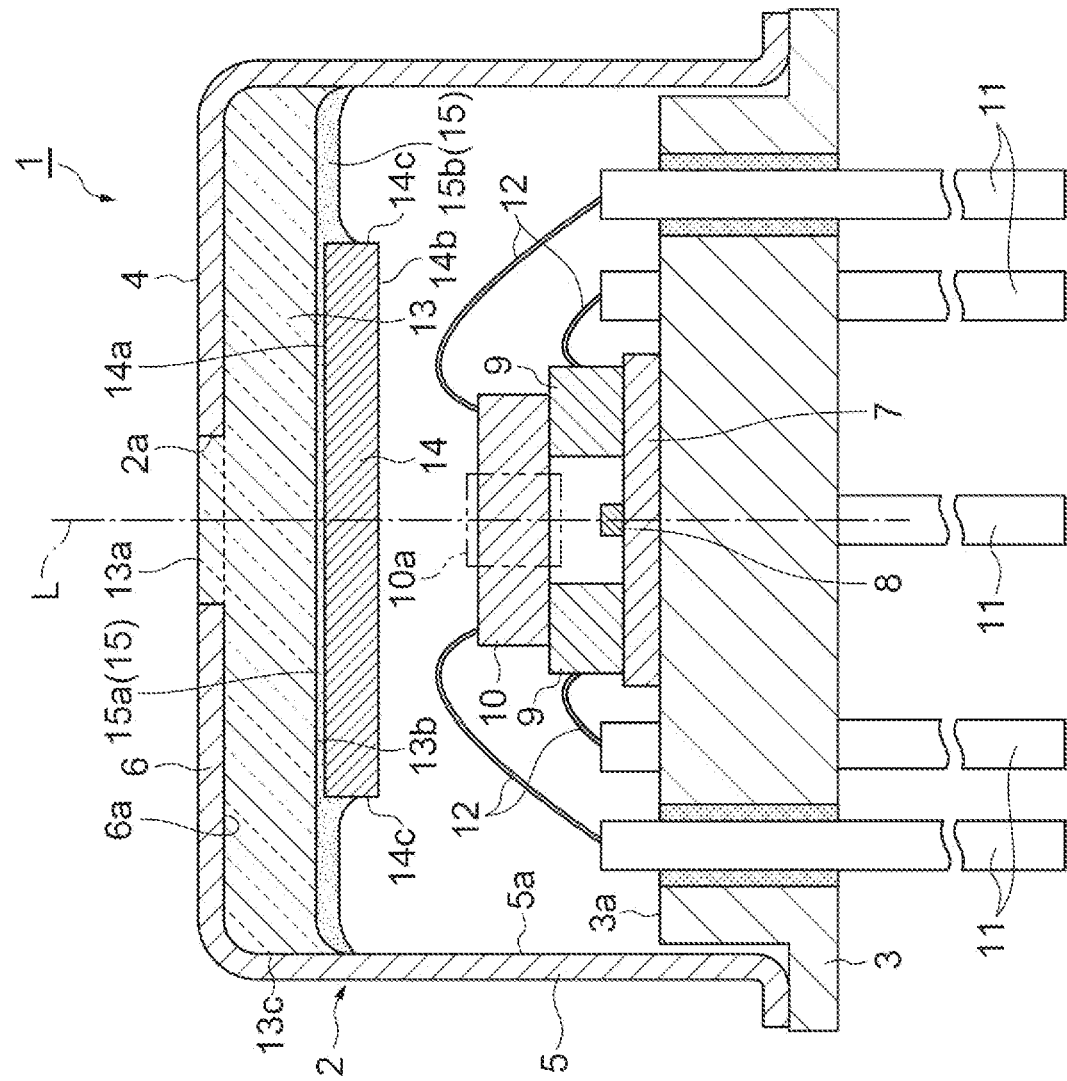
FIG. 1 is a cross-sectional view of a light detecting device applied to a spectroscopic module of an embodiment.

Prior to the description of a spectroscopic module of an embodiment, a light detecting device applied to the spectroscopic module will be described. As illustrated in FIG. 1, a light detecting device 1 includes a housing 2. In the present embodiment, the housing 2 is a CAN package having a stem 3 and a cap 4. The cap 4 has a side wall 5 and a top wall 6 that are integrally formed. The material of the stem 3 and the cap 4 is, for example, metal. The cap 4 has a cylindrical shape with a line L as the center line.

A wiring substrate 7 is fixed to the inner surface 3a of the stem 3. The substrate material of the wiring substrate 7 is, for example, silicon, ceramic, quartz, glass, plastic, or the like. A light detector 8 and a temperature detector (not illustrated) such as a thermistor are mounted on the wiring substrate 7. The light detector 8 is arranged in the housing 2 so that the center line of a light receiving portion of the light detector coincides with the line L. In the present embodiment, the light detector 8 is an infrared detector, and is configured by, for example, a light receiving element such as an InGaAs photodiode, a thermopile, or a bolometer. Note that the light detector 8 may be configured by a light receiving element such as a Si photodiode when detecting ultraviolet light, visible light, or near infrared light. In addition, the light detector 8 may include only one light receiving element, or may include a plurality of light receiving elements.

A plurality of spacers 9 are fixed on the wiring substrate 7. The material of the spacer 9 is, for example, silicon, ceramic, quartz, glass, plastic, or the like. A Fabry-Perot interference filter 10 is fixed on the plurality of spacers 9. The Fabry-Perot interference filter 10 is arranged in the housing 2 such that the center line of the light transmission region 10a thereof coincides with the line L. Note that the plurality of the spacers 9 may be integrally formed with the wiring substrate 7. Further, the Fabry-Perot interference filter 10 may be fixed on one spacer 9.

A plurality of lead pins 11 is secured to the stem 3. Each of the lead pins 11 penetrates through the stem 3 in a state where electrical insulation and airtightness between each of the lead pins and the stem 3 are maintained. The lead pins 11 are electrically connected to electrode pads of the wiring substrate 7 and terminals of the Fabry-Perot interference filter 10 via wires 12, respectively. This enables input and output of electric signals to and from each of the Fabry-Perot interference filter 10, the light detector 8, and the temperature detector.

An opening 2a is formed in the housing 2. The opening 2a is formed in the top wall 6 of the cap 4 such that the center line thereof coincides with the line L. In the present embodiment, the opening 2a has a circular shape when viewed from a direction parallel to the line L. On an inner surface 6a of the top wall 6, a light transmitting member 13 is bonded to close the opening 2a. The material of the light transmitting member 13 is, for example, glass. The light transmitting member 13 has a light incident surface 13a and a light emitting surface 13b that face each other in the direction parallel to the line L, and side surfaces 13c. The light incident surface 13a is substantially flush with an outer surface of the top wall 6 of the cap 4 at the opening 2a. The side surface 13c is in contact with the inner surface 5a of the side wall 5 of the cap 4. Such a light transmitting member 13 is formed by arranging a glass pellet inside a cap 4 with the opening 2a facing down and melting the glass pellet.

A band pass filter 14 is fixed to the light emitting surface 13b of the light transmitting member 13 by a bonding member 15 made of a light transmitting material. The band pass filter 14 selectively transmits light in a measurement wavelength range of the light detecting device 1 (being light in a predetermined wavelength range and light to be incident on the light transmission region 10a of the Fabry-Perot interference filter 10) in light transmitted through the light transmitting member 13. In the present embodiment, the band pass filter 14 has a quadrangular plate shape. The band pass filter 14 has a light incident surface 14a and a light emitting surface 14b facing each other in the direction parallel to the line L, and four side surfaces 14c. The band pass filter 14 is configured by, for example, a light transmitting member made of silicon, glass, or the like, and a dielectric multilayer film formed on the surface of the light transmitting member. The dielectric multilayer film is configured by a film made of a high-refractive material (for example, $TiO_2$ or $Ta_2O_5$) and a film made of a low-refractive material (for example, $SiO_2$ or $MgF_2$).

The bonding member 15 includes a first part 15a and a second part 15b. The first part 15a is a part of the bonding member 15, which is arranged between the light emitting surface 13b of the light transmitting member 13 and the light incident surface 14a of the band pass filter 14. The second part 15b is a portion of the bonding member 15, which is arranged between the side surface 14c of the band pass filter 14 and the inner surface 5a of the side wall 5 of the cap 4 on the light emitting surface 13b of the light transmitting member 13.

In the light detecting device 1 configured as described above, when light passes from the outside of the housing 2 through the opening 2a, the light transmitting member 13, and the bonding member 15, and then is incident on the band pass filter 14, only light in a predetermined wavelength range is transmitted through the band pass filter 14. The light transmitted through the band pass filter 14 is incident on the light transmission region 10a of the Fabry-Perot interference filter 10, and the light having a wavelength corresponding to the distance between the first mirror 35 and the second mirror 36, which will be described later, is transmitted through the light transmission region 10a. The light transmitted through the light transmission region 10a is incident on the light receiving portion of the light detector 8 and detected by the light detector 8. Therefore, the intensity of the light transmitted through the light transmission region 10a is detected by the light detector 8 while changing the distance between the first mirror 35 and the second mirror 36 in the Fabry-Perot interference filter 10. Thus, it is possible to obtain a spectral spectrum.

[Fabry-Perot Interference Filter]

Figure 2:
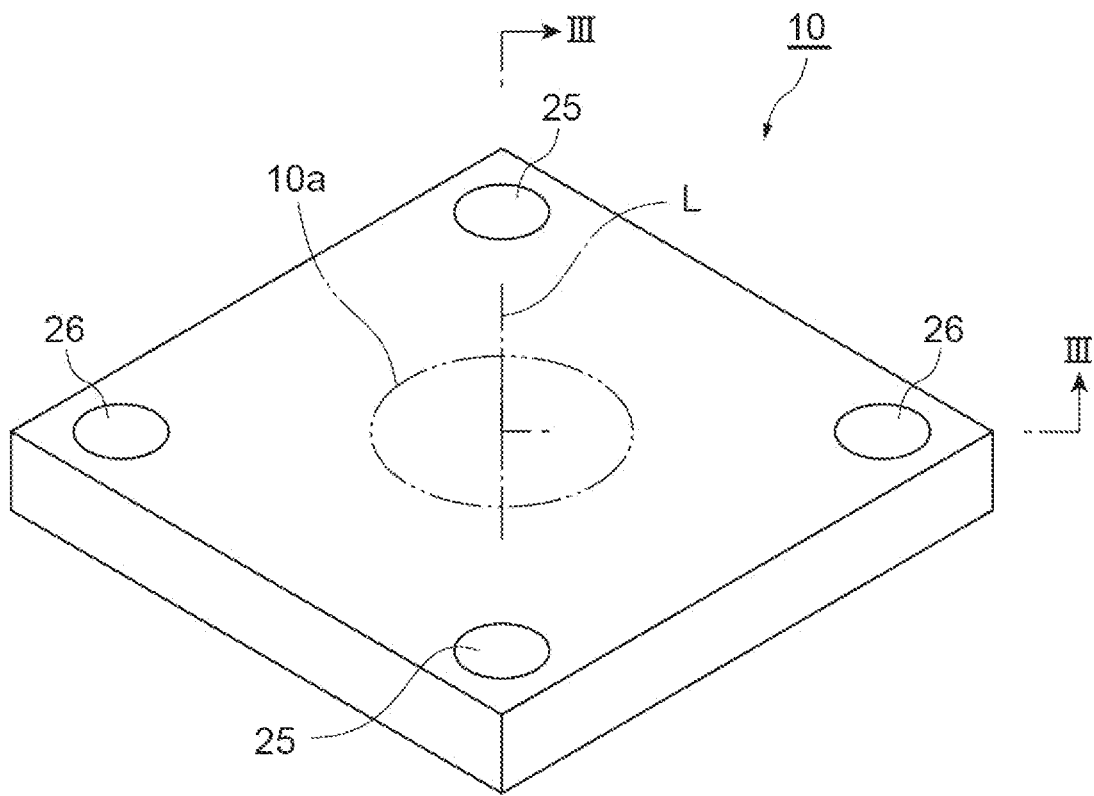
FIG. 2 is a perspective view of a Fabry-Perot interference filter illustrated in FIG. 2.
Figure 3:
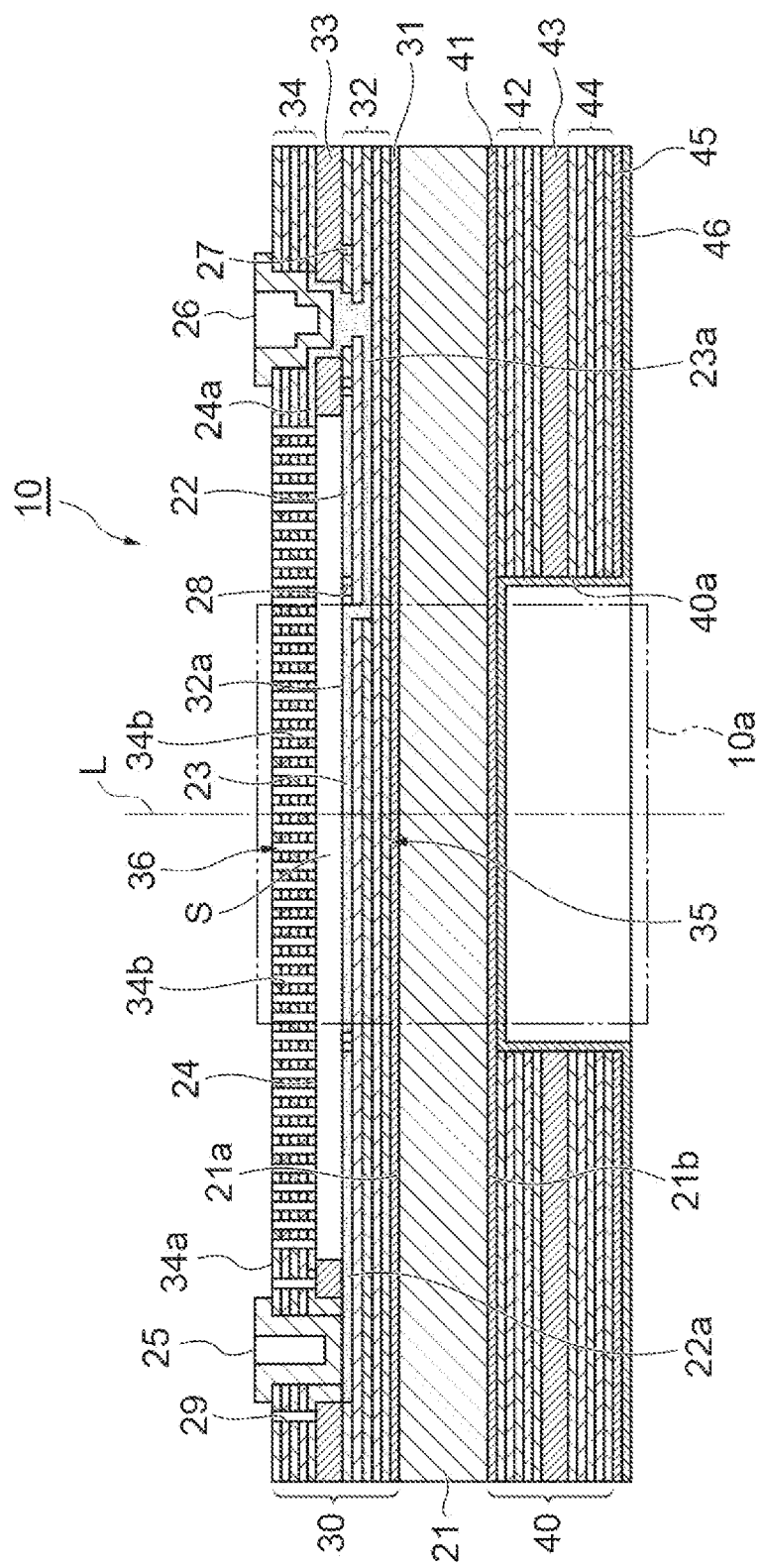
FIG. 3 is a cross-sectional view taken along line III-III illustrated in FIG. 3.

The Fabry-Perot interference filter 10 described above will be described in more detail. As illustrated in FIGS. 2 and 3, in the Fabry-Perot interference filter 10, the light transmission region 10a that transmits light having a wavelength corresponding to the distance between a first mirror 35 and a second mirror 36 is provided. The light transmission region 10a is, for example, a columnar region with the line L as the center line.

The Fabry-Perot interference filter 10 includes a substrate 21. The substrate 21 has, for example, a rectangular plate shape. The material of the substrate 21 is, for example, silicon, quartz, glass, or the like. The substrate 21 has a first surface 21a and a second surface 21b facing each other in a direction parallel to line L. The first surface 21a is a surface on the light incident side (band pass filter 14 side). The second surface 21b is a surface on the light emission side (light detector 8 side).

A first layer structure 30 is arranged on the first surface 21a of the substrate 21. The first layer structure 30 includes a first antireflection layer 31, a first laminated body 32, a first intermediate layer 33, and a second laminated body 34 laminated on the first surface 21a in the order mentioned. A gap (air gap) S is formed between the first laminated body 32 and the second laminated body 34 by the first intermediate layer 33 of a frame shape. When the material of the substrate 21 is silicon, the material of the first antireflection layer 31 and the first intermediate layer 33 is, for example, silicon oxide. The thickness of the first intermediate layer 33 is, for example, several tens nanometers to several tens micrometers.

A part of the first laminated body 32 corresponding to the light transmission region 10a functions as a first mirror 35.

The first laminated body 32 includes a plurality of polysilicon layers and a plurality of silicon nitride layers with each of the plurality of layers laminated alternately. The optical thickness of each of the polysilicon layers and the silicon nitride layers forming the first mirror 35 is preferably an integral multiple of a quarter of the central transmission wavelength of light transmitted through the light transmission region 10a. The first mirror 35 may be arranged on the first surface 21a of the substrate 21 without the first antireflection layer 31 interposed therebetween.

A part of the second laminated body 34 corresponding to the light transmission region 10a functions as a second mirror 36. The second mirror 36 faces the first mirror 35 via the gap S in the direction parallel to line L. The second laminated body 34 includes a plurality of polysilicon layers and a plurality of silicon nitride layers with each of the plurality of layers laminated alternately. The optical thickness of each of the polysilicon layers and the silicon nitride layers forming the second mirror 36 is preferably an integral multiple of a quarter of the central transmission wavelength of light transmitted through the light transmission region 10a.

Note that, in the first laminated body 32 and the second laminated body 34, silicon oxide layers may be arranged instead of the silicon nitride layers. Further, the material of each layer included in the first laminated body 32 and the second laminated body 34 is not limited to the material described above. For example, titanium oxide, tantalum oxide, zirconium oxide, magnesium fluoride, aluminum oxide, calcium fluoride, silicon, Germanium, zinc sulfide, or the like may be provided.

A plurality of through holes 34b are formed in a part of the second laminated body 34 corresponding to the gap S. Each of the through holes 34b reaches the gap S from a surface 34a of the second laminated body 34 on the side opposite to the first laminated body 32. The plurality of through holes 34b is formed such that there is substantially no impact on the function of the second mirror 36. The plurality of through holes 34b have been used to form the gap S by removing a part of the first intermediate layer 33 by etching.

A first electrode 22 is formed in the first laminated body 32 so as to surround the light transmission region 10a. A second electrode 23 is formed in the first laminated body 32 so as to include the light transmission region 10a. The first electrode 22 and the second electrode 23 are formed by doping a polysilicon layer closest to the gap S in the first laminated body 32 with an impurity to reduce the resistance. A third electrode 24 is formed in the second laminated body 34 so as to face the first electrode 22 and the second electrode 23 with the gap S interposed therebetween. The third electrode 24 is formed by doping a polysilicon layer closest to the gap S in the second laminated body 34 with an impurity to reduce the resistance. Note that the second electrode 23 may have a size substantially equal to or larger than that of the light transmission region 10a.

The first layer structure 30 is provided with one pair of first terminals 25 and one pair of second terminals 26. The paired first terminals 25 face each other across the light transmission region 10a. Each of the first terminals 25 is arranged in a through hole extending from the surface 34a of the second laminated body 34 to the first laminated body 32. Each of the first terminals 25 is electrically connected to the first electrode 22 via a wiring 22a formed in the first laminated body 32. The paired second terminals 26 face to each other across the light transmission region 10a in a direction perpendicular to the direction in which the paired first terminals 25 face each other. Each of the second terminals 26 is arranged in a through hole extending from the surface 34a of the second laminated body 34 to the inside of the first intermediate layer 33. Each of the second terminals 26 is electrically connected to the second electrode 23 via a wiring 23a formed in the first laminated body 32, and is electrically connected to the third electrode 24 via a wiring 24a formed in the second laminated body 34.

Trenches 27 and 28 are formed on the surface 32a of the first laminated body 32 on the second laminated body 34 side. The trench 27 extends annularly so as to surround a connecting part of the wiring 23a with the second terminal 26. The trench 27 electrically insulates the first electrode 22 from the wiring 23a. A trench 28 annularly extends along the inner perimeter of the first electrode 22. The trench 28 electrically insulates the first electrode 22 from the region inside the first electrode 22 (that is, the region where the second electrode 23 is). Trenches 29 are formed on the surface 34a of the second laminated body 34. A trench 29 annularly extends so as to surround a first terminal 25. The trench 29 electrically insulates the first terminal 25 from the third electrode 24. Regions inside the trenches 27, 28, and 29 may contain an insulating material or may be a gap.

A second layer structure 40 is arranged on the second surface 21b of the substrate 21. The second layer structure 40 includes a second antireflection layer 41, a third laminated body 42, a second intermediate layer 43, and a fourth laminated body 44 laminated on the second surface 21b in the order mentioned. The second antireflection layer 41, the third laminated body 42, the second intermediate layer 43, and the fourth laminated body 44 have similar configurations to those of the first antireflection layer 31, the first laminated body 32, the first intermediate layer 33, and the second laminated body 34, respectively. That is, the second layer structure 40 has a laminate structure symmetrical to the first layer structure 30 with respect to the substrate 21. The second layer structure 40 is configured to correspond to the first layer structure 30, so as to prevent warping of the Fabry-Perot interference filter 10.

An opening 40a is formed in the third laminated body 42, the second intermediate layer 43, and the fourth laminated body 44 so as to include the light transmission region 10a. The opening 40a has, for example, a columnar shape with the line L as the center line, and has a diameter substantially equal to that of the light transmission region 10a. The opening 40a opens on the light emission side, and the bottom surface of the opening 40a extends to the second antireflection layer 41. The opening 40a passes light transmitted by the first mirror 35 and the second mirror 36.

A light shielding layer 45 is formed on a surface of the fourth laminated body 44 on the light emission side. The material of the light shielding layer 45 is, for example, aluminum. A protective layer 46 is formed on the surface of the light shielding layer 45 and the inner surface of the opening 40a. The material of the protective layer 46 is, for example, aluminum oxide. Note that, by setting the thickness of the protective layer 46 at 1 to 100 nm (preferably, about 30 nm), optical influence by the protective layer 46 becomes negligible.

In the Fabry-Perot interference filter 10 configured in the above manner, when a voltage is applied between the first terminal 25 and the second terminal 26, a potential difference is generated between the first electrode 22 and the third electrode 24, and an electrostatic force corresponding to the potential difference is generated between the first electrode 22 and the third electrode 24. Thus, the second mirror 36 is attracted to the first mirror 35 side fixed to the substrate 21, and the distance between the first mirror 35 and the second mirror 36 changes. At this time, since no potential difference is generated between the second electrode and the third electrode 24, the flatness of the second mirror 36 in the light transmission region 10a is ensured. As described above, the distance between the first mirror 35 and the second mirror 36 is variable in the Fabry-Perot interference filter 10. Here, the wavelength of the light transmitted through the light transmission region 10a depends on the distance between the first mirror 35 and the second mirror 36. Therefore, it is possible to adjust the wavelength of light transmitted through the light transmission region 10a by adjusting the voltage applied between the first terminal 25 and the second terminal 26.

[Spectroscopic Module]

The spectroscopic module in the embodiment to which the above-described light detecting device 1 is applied will be described. In the following description, the facing direction of the first mirror 35 and the second mirror 36 (in the present embodiment, the direction parallel to the line L) is referred to as a direction A.

Figure 4:
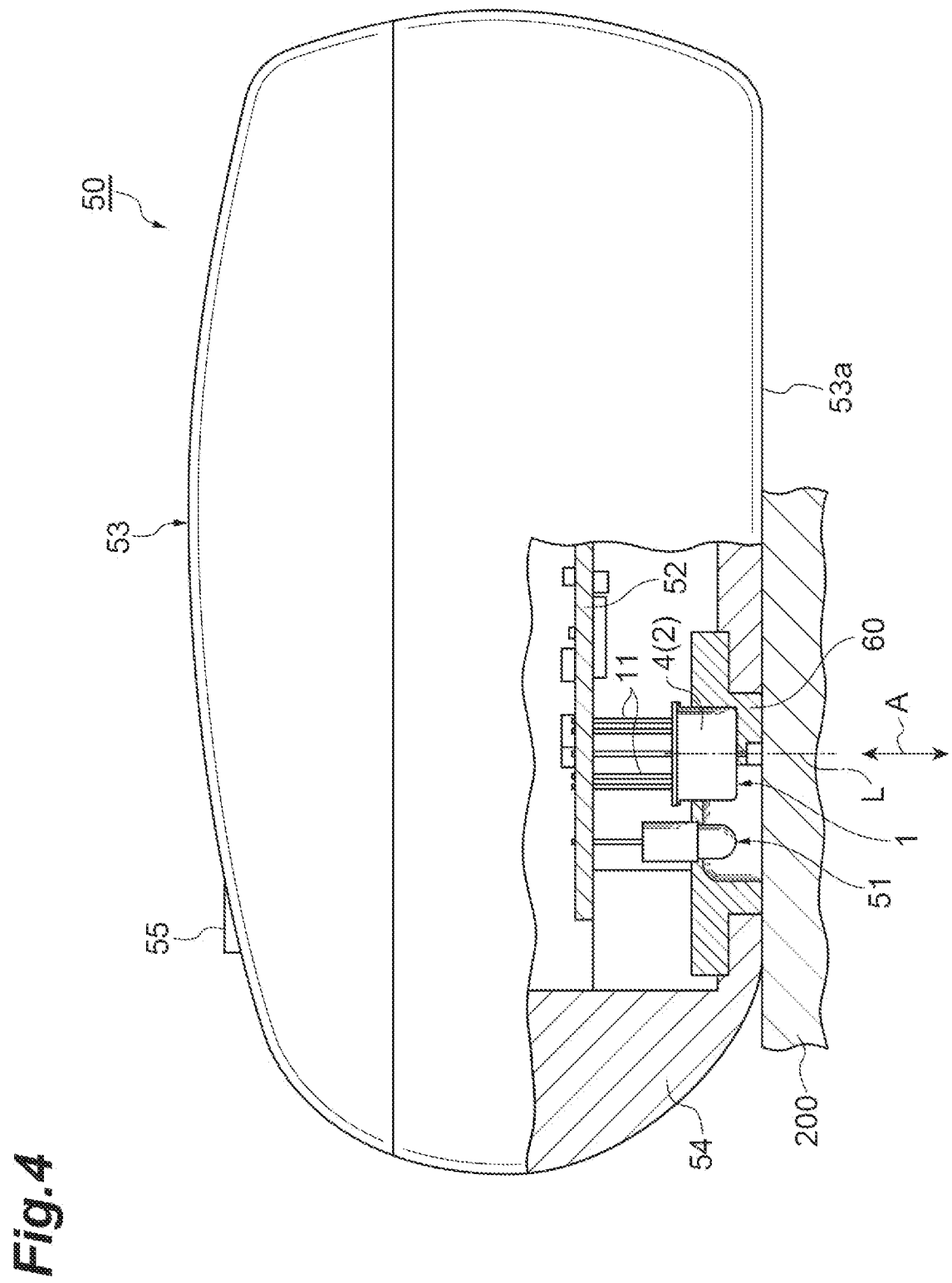
FIG. 4 is a side view of the spectroscopic module of the embodiment.

As illustrated in FIG. 4, the spectroscopic module 50 includes a light detecting device 1, a light source 51, a wiring substrate 52, and a package 53. The light source 51 emits light with which an object 200 is irradiated. The light source 51 is, for example, an infrared lamp that emits light in a wavelength range of near infrared light to mid-infrared light. A plurality of lead pins 11 of the light detecting device 1 and a plurality of lead pins of the light source 51 are electrically connected to the wiring substrate 52. The package 53 houses the light detecting device 1, the light source 51, the wiring substrate 52, a wireless communication board (not illustrated), a battery case (not illustrated), and the like. The package 53 is configured by a package body 54 and an aperture member 60. The light detecting device 1 and the light source 51 are supported by the aperture member 60 that forms a portion of the package 53. That is, in the spectroscopic module 50, the aperture member 60 functions as a support. Note that the package body 54 is provided with a switch 55 for starting the measurement.

Figure 5:
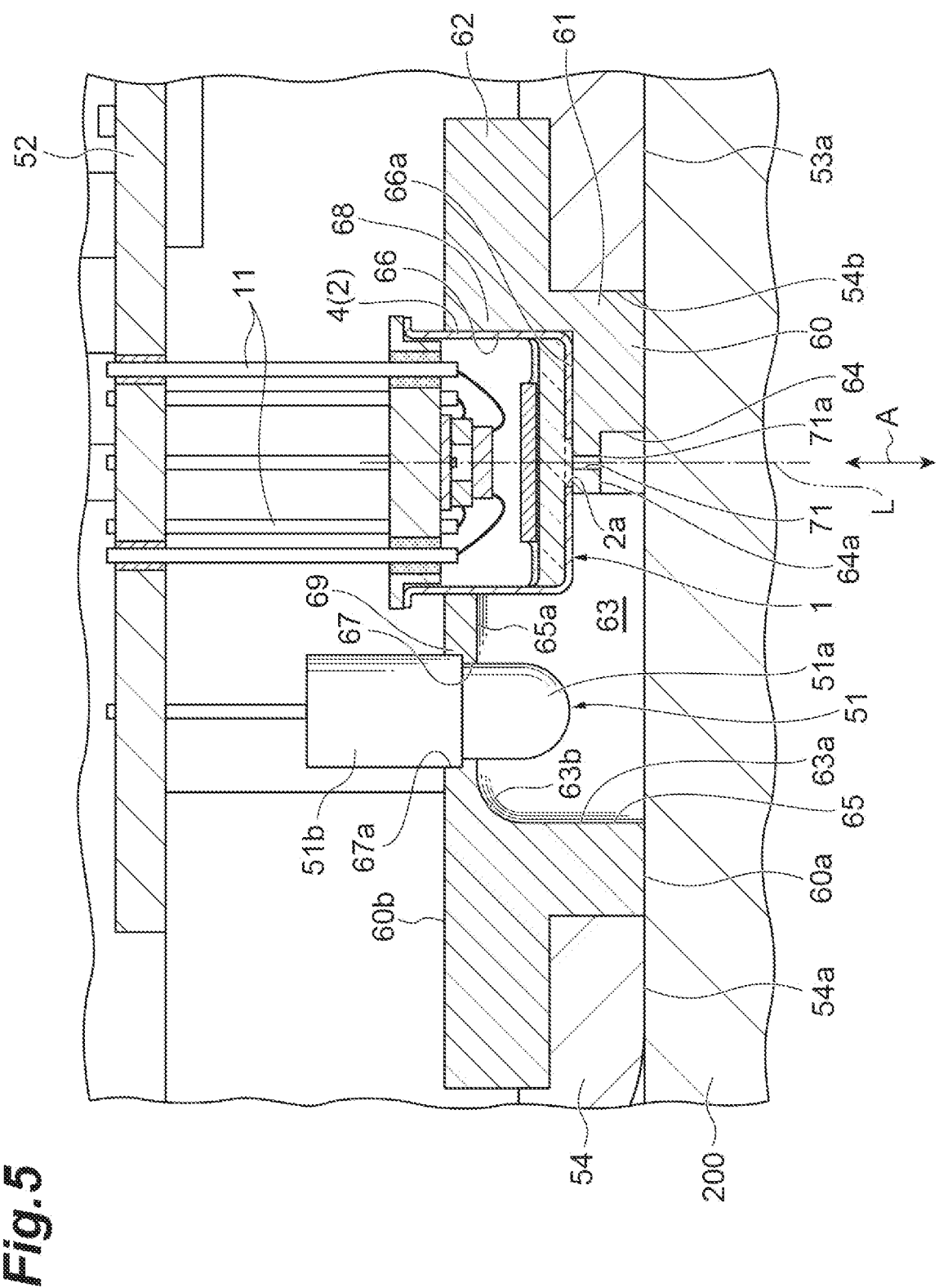
FIG. 5 is a cross-sectional view of a part of the spectroscopic module illustrated in FIG. 4.
Figure 6:
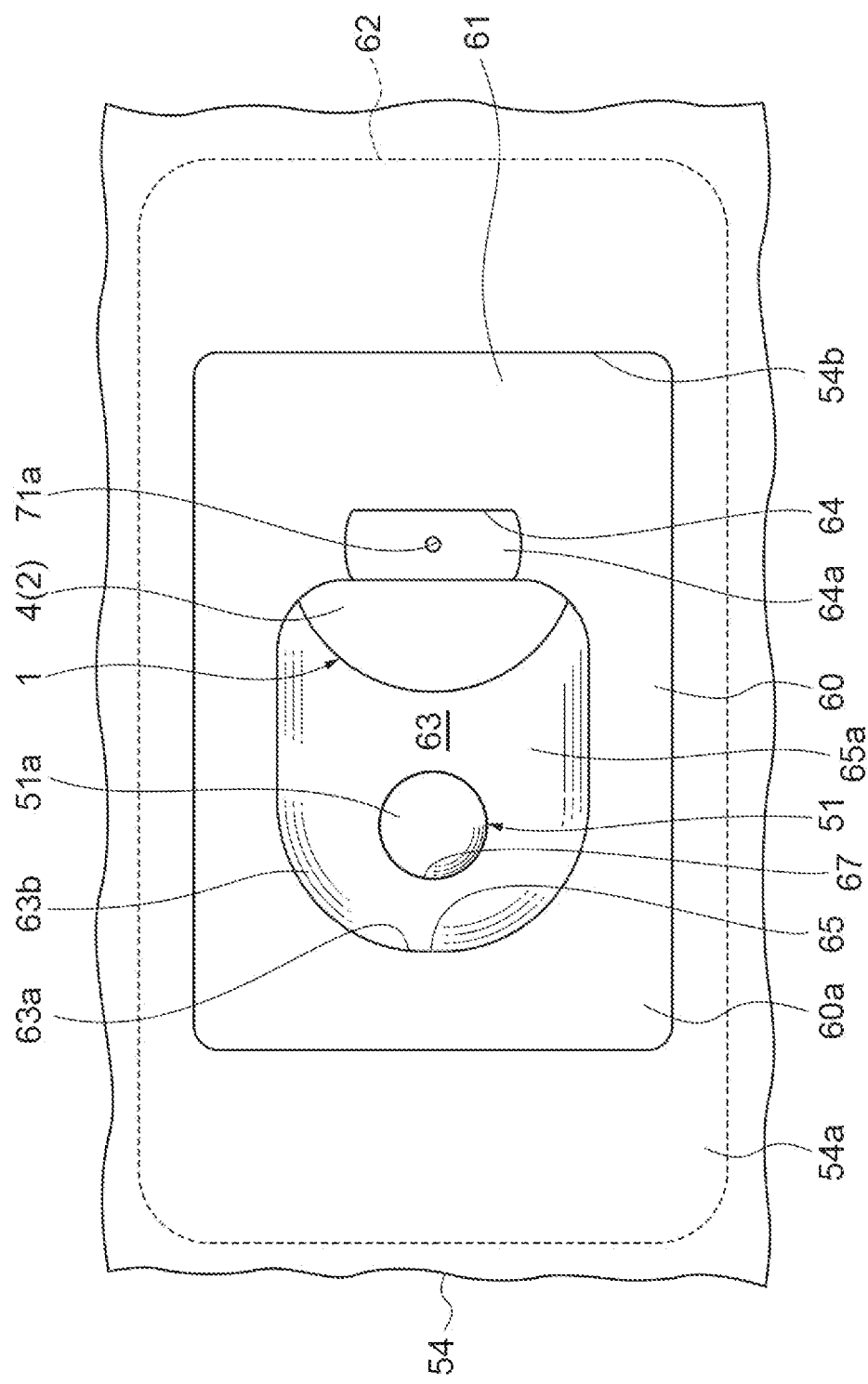
FIG. 6 is a bottom view of a part of the spectroscopic module illustrated in FIG. 4.

As illustrated in FIGS. 5 and 6, the aperture member 60 is attached to an opening 54b of the package body 54 in a state where the outer surface 60a is flush with the outer surface 54a of the package body 54. More specifically, in a state where the main body 61 of the aperture member 60 is arranged in the opening 54b and a flange portion 62 of the aperture member 60 is in contact with the opening 54b from the inside, the aperture member 60 is fixed to the opening 54b by a bolt (not illustrated) or the like. In the present embodiment, the flange portion 62 is integrally formed with the part of the main body 61 on the inner surface 60b side of the aperture member 60.

A recess 63 that opens to the outside of the package 53 is formed on the outer surface 60a of the aperture member 60. The recess 63 is configured by a first part 64 and a second part 65. The second part 65 is deeper than the first part 64. A concave curved surface 63b is formed between the bottom surface 65a of the second part 65 and the side surface 63a of the recess 63. The concave curved surface 63b has a shape corresponding to a round chamfered surface formed at a corner formed by the bottom surface 65a and the side surface 63a. A recess 66 that opens to the inside of the package 53 is formed on the inner surface 60b of the aperture member 60. When viewed from the direction A, the outer edge of the recess 66 is located outside the outer edge of the first part 64 of the recess 63. The recess 66 communicates with the second part 65 of the recess 63.

An aperture 71 is formed on the bottom surface 64a of the first part 64 of the recess 63. The aperture 71 is open to the bottom surface 64a of the first part 64 and the bottom surface 66a of the recess 66. A hole 67 is formed in the bottom surface 65a of the second part 65 of the recess 63. The hole 67 is open to the bottom surface 65a of the second part 65 and the inner surface 60b of the aperture member 60. The part of the hole 67 on the inner surface 60b side of the aperture member 60 is a widening portion 67a having a width that is widened in the direction perpendicular to the direction A. When viewed from the direction A, the hole 67 has a size including the aperture 71. That is, when the shapes of the hole 67 and the aperture 71 in the cross section perpendicular to the direction A are circular, the minimum diameter of the hole 67 in the cross section is larger than the maximum diameter of the aperture 71 in the cross section.

The housing 2 of the light detecting device 1 is arranged in the recess 66. More specifically, the cap 4 of the housing 2 is arranged in the recess 66 in a state where the opening 2a of the housing 2 opposes the aperture 71. Thus, the position of the housing 2 in the direction A and the position of the housing 2 in a direction perpendicular to the direction A are positioned. In the present embodiment, the peripheral part of the recess 66 in the aperture member 60 functions as a positioning portion 68 configured to position the housing 2.

The light source 51 is arranged in the hole 67. More specifically, the light source 51 is arranged in the hole 67 in a state where the light emitting portion 51a of the light source 51 is arranged at the second part 65 of the recess 63 and a lead pin holding portion 51b of the light source 51 is arranged in the widening portion 67a of the hole 67. Thus, the position of the light emitting portion 51a in the direction A and the position of the light emitting portion 51a in the direction perpendicular to the direction A are positioned. In the present embodiment, the peripheral portion of the hole 67 of the aperture member 60 functions as a positioning portion 69 configured to position the light emitting portion 51a.

In the spectroscopic module 50 configured as described above, a light incident opening 71a of the aperture 71 and the light emitting portion 51a of the light source 51 are located in the recess 63 formed on the outer surface 60a of the aperture member 60 forming a portion of the package 53. That is, the light incident opening 71a of the aperture 71 and the light emitting portion 51a of the light source 51 are arranged along the outer surface 53a of the package 53 so as to be adjacent to each other.

Figure 7:
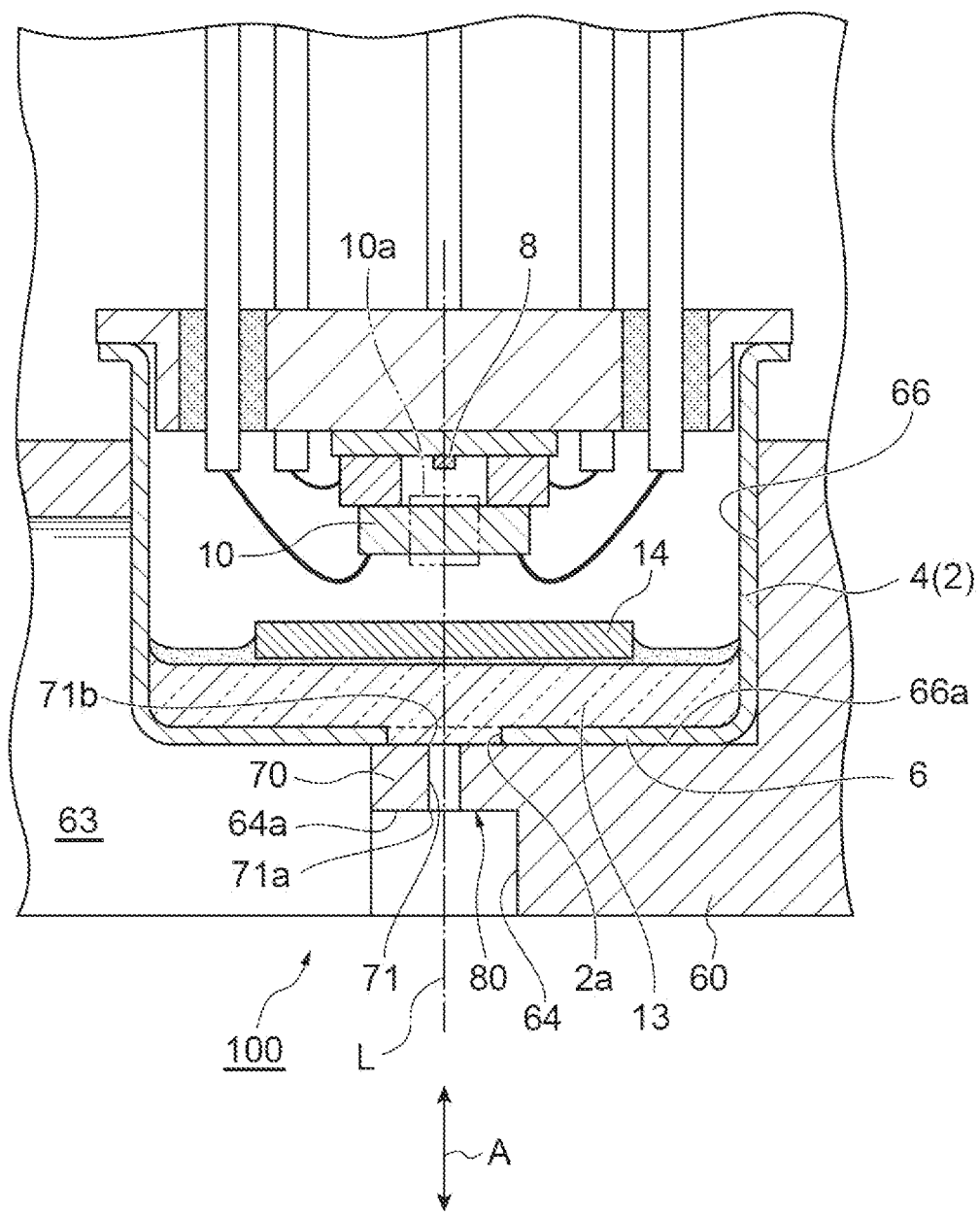
FIG. 7 is a cross-sectional view of a spectroscopic unit illustrated in FIG. 5.

The aperture 71 described above will be described in more detail. In the present embodiment, as illustrated in FIG. 7, a portion of the aperture member 60 between the bottom surface 64a of the first part 64 of the recess 63 and the bottom surface 66a of the recess 66 functions as an aperture portion 70 in which the aperture 71 is formed. That is, the aperture portion 70 is provided on the aperture member 60 formed separately from the housing 2 of the light detecting device 1. The band pass filter 14 is spaced from the aperture portion 70 with the top wall 6 of the cap 4 being a portion of the housing 2, the top wall 6 interposed therebetween. In the present embodiment, the aperture portion 70 and the band pass filter 14 form the light incident portion 80 provided in the housing 2. The housing 2, the light incident portion 80, the Fabry-Perot interference filter 10, and the light detector 8 form a spectroscopic unit 100.

The light incident opening 71a of the aperture 71 is a part of the aperture 71, which opens to the bottom surface 64a of the first part 64 of the recess 63. The light emission opening 71b of the aperture 71 is a part of the aperture 71 that opens to the bottom surface 66a of the recess 66. The incident angle and the emission angle of light passing through the aperture 71 (light passing through the aperture 71 in an ideal state ignoring the reflection and the like on the inner surface of the aperture 71) are defined by the light incident opening 71a and the light emission opening 71b. In other words, the light incident opening 71a and the light emission opening 71b are parts for defining the incident angle and the emission angle of the light passing through the aperture 71 (light passing through the aperture 71 in an ideal state ignoring the reflection and the like on the inner surface of the aperture 71).

The aperture portion 70 is configured so that a value obtained by dividing the length of the aperture 71 in the direction A by the width of the aperture 71 in the direction perpendicular to the direction A (referred to as an "aspect ratio of the aperture 71" below) is equal to or more than 0.5 and the entirety of light passing through the aperture 71 (light passing through the aperture 71 in an ideal state ignoring the reflection and the like on the inner surface of the aperture 71) is incident on the band pass filter 14. Further, the aperture portion 70 is configured so that the entirety of the light passing through the aperture 71 and being transmitted through the band pass filter 14 is incident on the Fabry-Perot interference filter 10.

The length of the aperture 71 in the direction A is the distance between the light incident opening 71a and the light emission opening 71b. The width of the aperture 71 in the direction perpendicular to the direction A is a value of ½ of the sum of the effective diameter of the light incident opening 71a and the effective diameter of the light emission opening 71b. The effective diameter of the light incident opening 71a is the diameter when the shape of the light incident opening 71a is circular, and is the diameter of a circle having the area when the shape of the light incident opening 71a is other than a circle. Similarly, the effective diameter of the light emission opening 71b is the diameter when the shape of the light emission opening 71b is circular, and is the diameter of a circle having the area when the shape of the light emission opening 71b is other than a circle.

When viewed from the direction A, the outer edge of the aperture 71 is located inside the outer edge of the light transmission region 10a of the Fabry-Perot interference filter 10. The area inside the aperture 71 is a space. The aperture 71 is a part that extends along the direction A from the light emission opening 71b for defining the emission angle and is a part having a width that does not change. In the present embodiment, the light incident opening 71a and the light emission opening 71b of the aperture 71 have a circular shape. The diameter of the aperture 71 is constant between the light incident opening 71a and the light emission opening 71b. That is, the region inside the aperture 71 has a columnar shape.

Actions and Effects

As described above, in the spectroscopic unit 100, the aperture portion 70 is configured so that the aspect ratio of the aperture 71 is equal to or more than 0.5, and the entirety of the light passing through the aperture 71 is incident on the band pass filter 14. Therefore, the entirety of the light passing through the aperture 71 is incident on the band pass filter 14 in a state where the range of the incident angle is narrowed. Thus, the band pass filter 14 functions properly, and light in a desired wavelength range is incident on the Fabry-Perot interference filter 10 in a state where the range of the incident angle is narrowed. Thus, the resolution in a spectral spectrum obtained by the Fabry-Perot interference filter 10 is improved. Therefore, according to the spectroscopic unit 100, it is possible to improve the spectroscopic accuracy of the Fabry-Perot interference filter 10. Note that, in order to improve the resolution in the spectral spectrum, the aspect ratio of the aperture 71 is preferably equal to or more than 1, and more preferably equal to or more than 2.

In addition, in the spectroscopic unit 100, the aperture portion 70 is configured so that the entirety of the light passing through the aperture 71 and being transmitted through the band pass filter 14 is incident on the Fabry-Perot interference filter 10. Thus, it is possible to suppress the generation of stray light in the housing 2.

Further, in the spectroscopic unit 100, when viewed from the direction A, the outer edge of the aperture 71 is located inside the outer edge of the light transmission region 10a of the Fabry-Perot interference filter 10. Thus, it is possible to increase the proportion of light transmitted through the light transmission region 10a of the Fabry-Perot interference filter 10 to the light passing through the aperture 71.

In addition, in the spectroscopic unit 100, the light detector 8 that detects the light transmitted through the Fabry-Perot interference filter 10 is arranged in the housing 2. Thus, it is possible to detect the dispersed light with high accuracy while suppressing the generation of noise caused by stray light. Further, because the light detector 8 is arranged in the housing 2, it is possible to reduce the size of the spectroscopic unit 100 including the light detector 8.

In addition, in the spectroscopic unit 100, the light incident opening 71a and the light emission opening 71b of the aperture 71 have a circular shape. Thus, it is possible to easily form the aperture 71 having desired performance.

Further, in the spectroscopic unit 100, the diameter of the aperture 71 is constant between the light incident opening 71a and the light emission opening 71b. Thus, it is possible to easily form the aperture 71 having desired performance.

Further, in the spectroscopic unit 100, the region inside the aperture 71 is a space. Thus, it is possible to prevent the loss of light due to passing through the aperture 71.

Further, in the spectroscopic unit 100, the aperture member 60 provided with the aperture portion 70 is formed separately from the housing 2. This makes it possible to improve the degree of freedom in designing the aperture portion 70, such as selection of a suitable material. In addition, by forming the large opening 2a in the housing 2, it is possible to adjust the positional relationship between the aperture 71 and the Fabry-Perot interference filter 10 while relaxing the positional accuracy of the Fabry-Perot interference filter 10 in the housing 2.

Further, in the spectroscopic unit 100, the positioning portion 68 configured to position the housing 2 is provided on the aperture member 60. Thus, it is possible to prevent deviation of the positional relationship between the aperture 71 and the Fabry-Perot interference filter 10 due to vibration or the like. Further, because the aperture portion 70 and the positioning portion 68 are provided in the aperture member 60, it is possible to ensure the positional accuracy between the aperture portion 70 and the positioning portion 68.

Further, in the spectroscopic unit 100, a hole 67 in which the light source 51 is arranged is formed in the aperture member 60. Thus, because the hole 67 and the aperture 71 are formed in the aperture member 60, it is possible to ensure the positional accuracy between the light source 51 and the aperture 71.

Further, in the spectroscopic unit 100, the aperture member 60 forms a part of the package 53 accommodating the housing 2. Thus, it is possible to more reliably suppress the generation of stray light in the housing 2.

Further, in the spectroscopic unit 100, the band pass filter 14 is spaced from the aperture portion 70 with a portion of the housing 2 interposed therebetween. Thus, because the band pass filter 14 is arranged in the housing 2, it is possible to protect the band pass filter 14 from physical interference and the like.

Further, in the spectroscopic module 50, the light incident opening 71a of the aperture 71 and the light emitting portion 51a of the light source 51 are arranged along the outer surface 53a of the package 53 so as to be adjacent to each other. Therefore, according to the spectroscopic module 50, it is possible to realize the reflection type spectroscopic module 50 in which the spectroscopic accuracy of the Fabry-Perot interference filter 10 is improved.

Further, in the spectroscopic module 50, the light incident opening 71a of the aperture 71 and the light emitting portion 51a of the light source 51 are located in the recess 63 formed on the outer surface 60a of the aperture member 60. Thus, as illustrated in FIG. 5, even in a state where the outer surface 60a of the aperture member 60 is brought into contact with an object 200, the region inside the recess 63 is secured as an optical path. Thus, it is possible to irradiate the object 200 with light and detect light reflected by the object 200.

Further, in the spectroscopic module 50, the aperture 71 is formed on the bottom surface 64a of the first part 64 of the recess 63. Thus, even in a state where the outer surface 60a of the aperture member 60 is brought into contact with an object 200, it is possible to reliably cause light reflected by the object 200 to be incident on the aperture 71.

Further, in the spectroscopic module 50, the hole 67 in which the light source 51 is arranged is formed on the bottom surface 65a of the second part 65 of the recess 63 deeper than the first part 64. Thus, even in a state where the outer surface 60a of the aperture member 60 is brought into contact with an object 200, it is possible to sufficiently irradiate the object 200 with light emitted from the light source 51.

Further, in the spectroscopic module 50, the concave curved surface 63b is formed between the bottom surface 65a of the second part 65 and the side surface 63a of the recess 63. Thus, because the object 200 is also irradiated with the light reflected by the concave curved surface 63b, it is possible to more sufficiently irradiate the object 200 with the light emitted from the light source 51.

Further, in the spectroscopic module 50, the hole 67 has a size including the aperture 71 when viewed from the direction A. Thus, it is possible to irradiate the object 200 with light emitted from the light source 51 over a wide range.

Modifications

The present disclosure is not limited to the above embodiment. For example, in the above-described reflection type spectroscopic module 50, even in a state where the outer surface 60a of the aperture member 60 is spaced from the object 200 without bringing the outer surface 60a of the aperture member 60 into contact with the object 200, it is possible to irradiate the object 200 with light and detect light reflected by the object 200. Further, the spectroscopic unit 100 may be applied to a transmissive type spectroscopic module 50 that detects light emitted from the light source 51 and transmitted through an object 200. Further, the spectroscopic unit 100 may not include the light detector 8, and light transmitted through the Fabry-Perot interference filter 10 may be detected by the light detector 8 arranged outside the housing 2.

Further, the aperture portion 70 may be configured so that the aspect ratio of the aperture 71 is equal to or more than 0.5, and the entirety of the light passing through the aperture 71 is incident on at least the band pass filter 14. Further, when viewed from the direction A, the outer edge of the aperture 71 may be located outside the outer edge of the light transmission region 10a of the Fabry-Perot interference filter 10. In this case, it is possible to sufficiently ensure the amount of light entering the housing 2.

Figure 8:
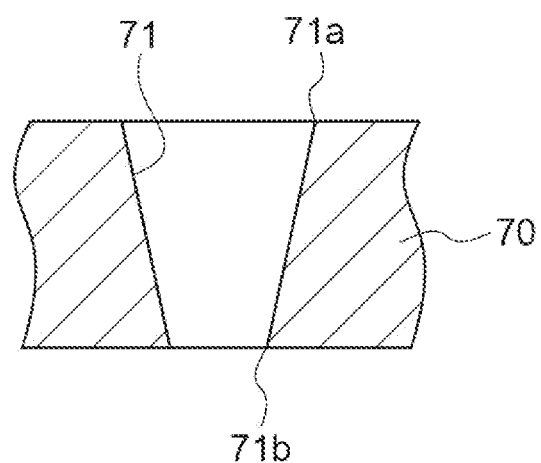
FIG. 8 is a cross-sectional view of an aperture portion of a modification.
Figure 8:
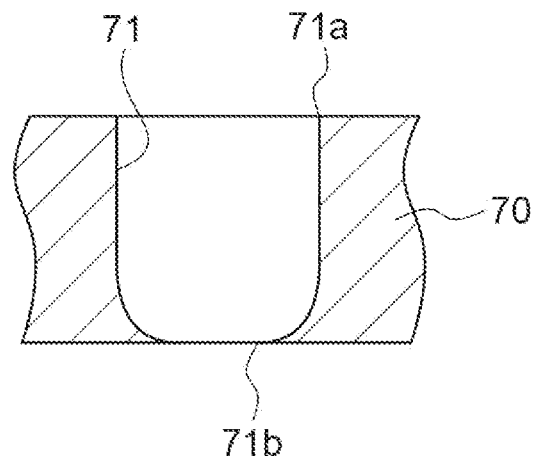

Further, as illustrated in FIG. 8(a), the diameter of the aperture 71 may be reduced from the light incident opening 71a to the light emission opening 71b at a constant reduction rate (constant reduction rate more than 0). That is, the region inside the aperture 71 may have a truncated cone shape in which the diameter is reduced from the light incident opening 71a to the light emission opening 71b. Further, as illustrated in FIG. 8(b), the diameter of the aperture 71 may be reduced from the light incident opening 71a to the light emission opening 71b at a reduction rate of 0 or more. That is, a portion of the region in the aperture 71 may have a columnar shape. In this case, the reduction ratio may be continuous between the light incident opening 71a and the light emission opening 71b (that is, there is no step) and increase at at least a portion between the light incident opening 71a and the light emission opening 71b. In the aperture 71 illustrated in FIG. 8(b), the reduction rate is increased at a part including the light emission opening 71b.

Further, the diameter of the aperture 71 may be enlarged from the light incident opening 71a to the light emission opening 71b at a constant enlargement ratio (constant enlargement ratio more than 0). That is, the region inside the aperture 71 may have a truncated cone shape in which the diameter is enlarged from the light incident opening 71a to the light emission opening 71b. Further, the diameter of the aperture 71 may be reduced from the light incident opening 71a to the light emission opening 71b at the enlargement ratio of 0 or more. That is, a portion of the region in the aperture 71 may have a columnar shape. In this case, the enlargement ratio may be continuous between the light incident opening 71a and the light emission opening 71b (that is, there is no step) and decrease at at least the portion between the light incident opening 71a and the light emission opening 71b (for example, part including the light incident opening 71a).

That is, the diameter of the aperture 71 may change at a constant change ratio from the light incident opening 71a to the light emission opening 71b. Alternatively, the diameter of the aperture 71 may change from the light incident opening 71a to the light emission opening 71b at a change ratio of 0 or more. The change ratio may be continuous between the light incident opening 71a and the light emission opening 71b and change at at least a portion between the light incident opening 71a and the light emission opening 71b. In any case, it is possible to easily form the aperture 71 having the desired performance.

Figure 9:
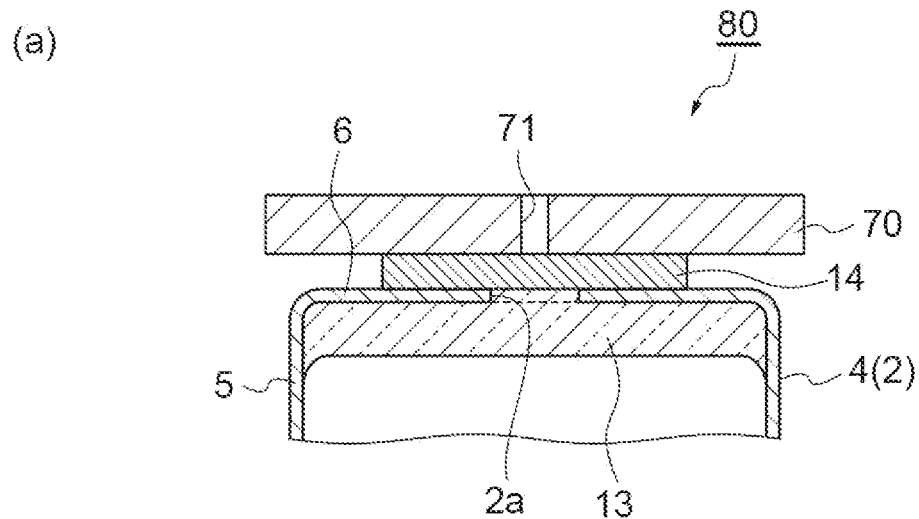
FIG. 9 is a cross-sectional view of a light incident portion of the modification.
Figure 9:
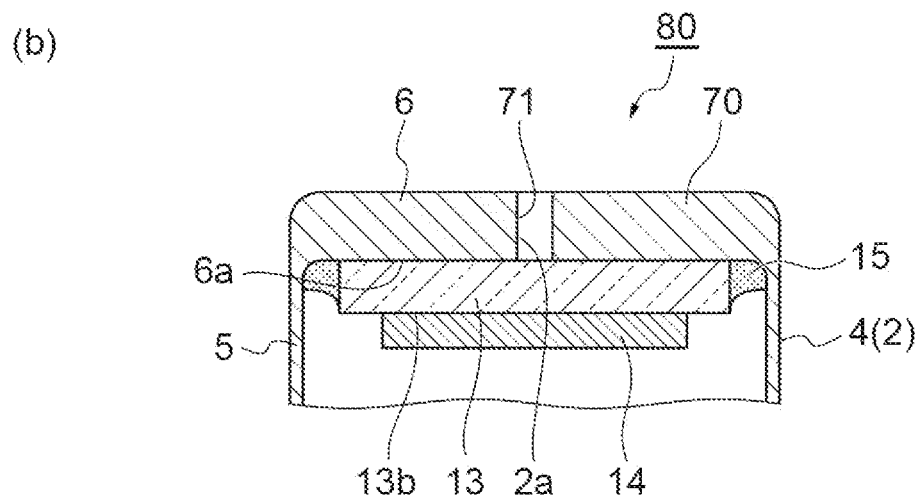

Further, as illustrated in FIG. 9(a), the band pass filter 14 may be in contact with the aperture portion 70. In the light incident portion 80 illustrated in FIG. 9(a), the band pass filter 14 is arranged on the top wall 6 of the cap 4 to cover the opening 2a of the housing 2. The aperture portion 70 is arranged on the band pass filter 14. When the band pass filter 14 is in contact with the aperture portion 70, it is possible to more reliably cause the entirety of light passing through the aperture 71 to be incident on the band pass filter 14. Note that, in the light incident portion 80 illustrated in FIG. 9(a), the aperture portion 70 is also the aperture member 60 formed separately from the housing 2. Further, as illustrated in FIG. 9(b), the aperture portion 70 may be integrally formed with the housing 2. In the light incident portion 80 illustrated in FIG. 9(b), the top wall 6 of the cap 4 functions as the aperture portion 70, and the opening 2a formed in the top wall 6 functions as the aperture 71. When the aperture portion 70 is integrally formed with the housing 2, it is possible to prevent the occurrence of a situation in which the positional relationship between the aperture 71 and the Fabry-Perot interference filter 10 is deviated by vibration or the like, with a simple configuration. Note that, in the light incident portion 80 illustrated in FIG. 9(b), the light transmitting member 13 is fixed to the inner surface 6a of the top wall 6 by the bonding member 15, and the band pass filter 14 is fixed to the light emitting surface 13b of the light transmitting member 13. The band pass filter 14 may be fixed to the inner surface 6a of the top wall 6 by the bonding member 15. Further, in the light incident portion 80, a space may be provided between the aperture 71 and the band pass filter 14. Further, for example, a lens and/or an optical fiber may be arranged in the aperture 71.

REFERENCE SIGNS LIST

2: housing, 8: light detector, 10: Fabry-Perot interference filter, 10a: light transmission region, 14: band pass filter, 35: first mirror, 36: second mirror, 50: spectroscopic module, 51: light source, 51a: light emitting portion, 53: package, 53a: outer surface, 60: aperture member, 60a: outer surface, 63: recess, 63a: ide surface, 63b: curved surface, 64: first part, 64a: bottom surface, 65: second part, 65a: bottom surface, 67: hole, 68: positioning portion, 70: aperture portion, 71: aperture, 71a: light incident opening, 71b: light emission opening, 80: light incident portion, 100: spectroscopic unit.

The invention claimed is:

1. A spectroscopic unit comprising:
a housing;
a light incident portion provided to the housing; and
a Fabry-Perot interference filter arranged in the housing and having a first mirror and a second mirror, a distance between the first mirror and the second mirror being variable,
wherein the light incident portion has
an aperture portion in which an aperture is formed, and
a band pass filter arranged between the aperture and the Fabry-Perot interference filter, and
the aperture portion is formed separately from the housing, and is configured so that the entirety of light passing through the aperture is incident on the band pass filter.

2. The spectroscopic unit according to claim 1, wherein the aperture portion is configured so that the entirety of the light that has passed through the aperture and been transmitted through the band pass filter is incident on the Fabry-Perot interference filter.

3. The spectroscopic unit according to claim 1, wherein, when viewed from the facing direction, an outer edge of the aperture is located inside an outer edge of a light transmission region of the Fabry-Perot interference filter.

4. The spectroscopic unit according to claim 1, further comprising: a light detector arranged in the housing and detecting light transmitted through the Fabry-Perot interference filter.

5. The spectroscopic unit according to claim 1, wherein a light incident opening and a light emission opening of the aperture have a circular shape.

6. The spectroscopic unit according to claim 5, wherein a diameter of the aperture is constant between the light incident opening and the light emission opening.

7. The spectroscopic unit according to claim 5, wherein a diameter of the aperture changes from the light incident opening to the light emission opening at a constant change ratio.

8. The spectroscopic unit according to claim 5, wherein a diameter of the aperture changes from the light incident opening to the light emission opening at a change ratio of 0 or more, and
the change ratio is continuous between the light incident opening and the light emission opening and changes at at least a portion between the light incident opening and the light emission opening.

9. The spectroscopic unit according to claim 1, wherein a region inside the aperture is a space.

10. The spectroscopic unit according to claim 1, further comprising: an aperture member formed separately from the housing and provided with the aperture portion.

11. The spectroscopic unit according to claim 10, wherein the aperture member is provided with a positioning portion configured to position the housing.

12. The spectroscopic unit according to claim 10, wherein a hole in which a light source is arranged is formed in the aperture member.

13. The spectroscopic unit according to claim 10, wherein the aperture member forms at least a portion of a package accommodating the housing.

14. The spectroscopic unit according to claim 10, wherein the band pass filter is spaced from the aperture portion with a portion of the housing interposed therebetween.

15. The spectroscopic unit according to claim 10, wherein the band pass filter is in contact with the aperture portion.

16. The spectroscopic unit according to any one of claim 1, wherein the aperture faces an opening formed in the housing, and the width of the aperture is smaller than the width of the opening formed in the housing.

17. A spectroscopic module comprising:
the spectroscopic unit according to claim 1;
a light source; and
a package accommodating the housing of the spectroscopic unit and the light source,
wherein a light incident opening of the aperture and a light emitting portion of the light source are arranged along an outer surface of the package so as to be adjacent to each other.

18. The spectroscopic module according to claim 17, wherein the light incident opening of the aperture and the light emitting portion of the light source are located in a recess formed on the outer surface.

19. The spectroscopic module according to claim 18, wherein the aperture is formed on a bottom surface of a first part of the recess.

20. The spectroscopic module according to claim 19, wherein a hole in which the light source is arranged is formed on a bottom surface of a second part of the recess, the second part being deeper than the first part.

21. The spectroscopic module according to claim 20, wherein a concave curved surface is formed between the bottom surface of the second part and a side surface of the recess.

22. The spectroscopic module according to claim 20, wherein the hole has a size including the aperture when viewed from the facing direction.

* * * * *